March 16, 1937.                C. O. ROSS                 2,073,882
                              VEHICLE SPRING
                           Filed April 6, 1936
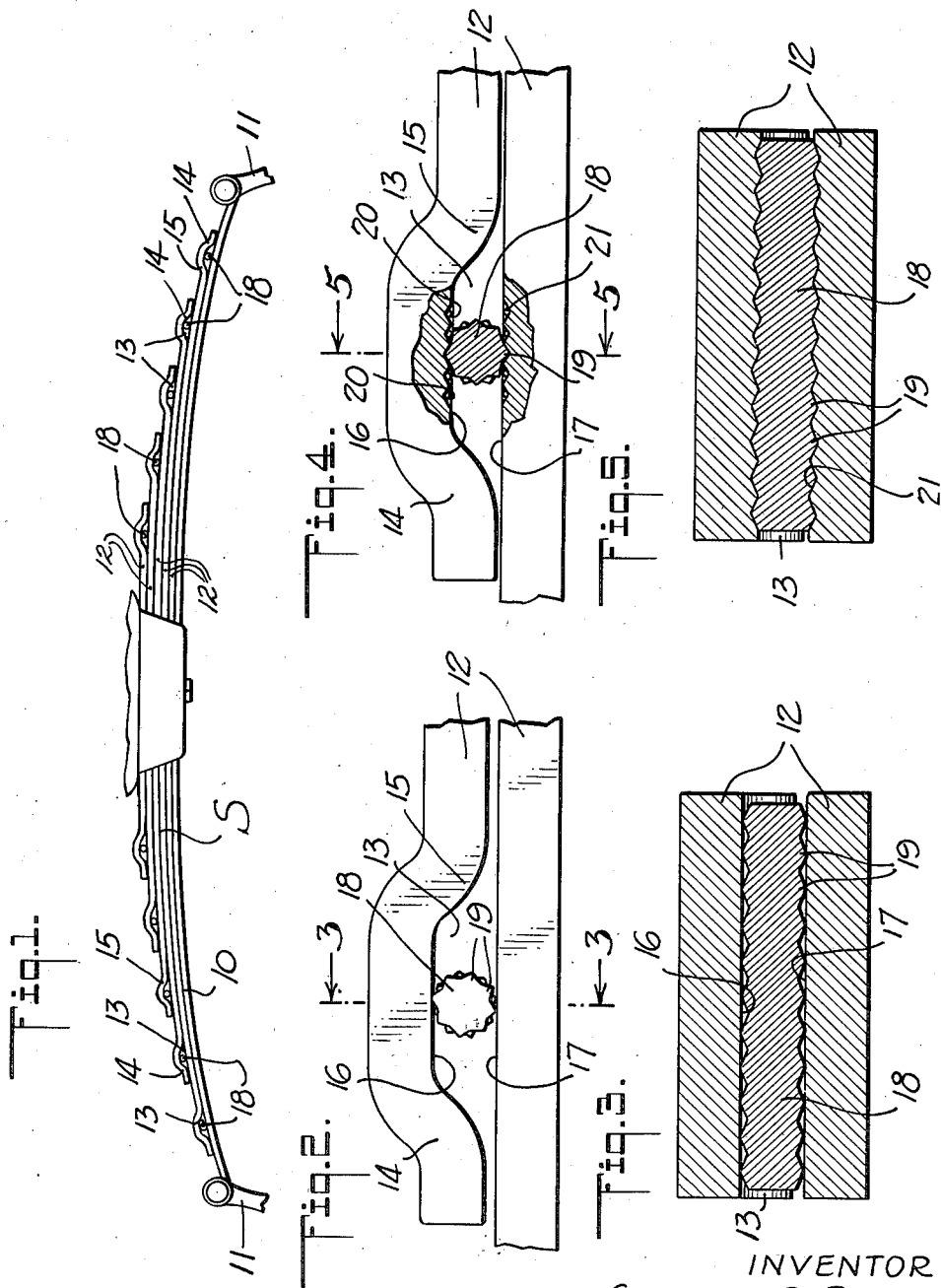
INVENTOR
CLIFFORD O. ROSS
BY
ATTORNEYS Patented Mar. 16, 1937

2,073,882

UNITED STATES PATENT OFFICE 2,073,882

VEHICLE SPRING

Clifford O. Ross, Beverly Hills, Calif.

Application April 6, 1936, Serial No. 72,880

2 Claims. (Cl. 267—49)

This invention relates generally to spring suspension mechanisms and more particularly to multi-leaf springs as employed in motor vehicles to suspend the chasses thereof.

An object of this invention is to provide a multi-leaf spring which is structurally characterized to obviate squeaking and to reduce to a negligible minimum friction at the sliding contact surface of the tip of each leaf with the next leaf by interposing an anti-friction body therebetween which spaces apart and has rolling contact with the confronting surfaces of the leaves as the spring is flexed.

Another object of the invention is to provide a leaf spring embodying anti-friction bodies as above structurally characterized and functionally related, wherein preferably the bodies and spring surfaces in rolling contact therewith have coacting means for preventing lateral tilting and axial displacement of the bodies, this coacting means in the preferred embodiment being in the nature of projections or teeth on the peripheries of the bodies which are of a greater hardness than the material of the spring so as to produce complementary indentations in the relatively softer leaves during rolling motion of the bodies, for coaction with the peripheral projections in performing the aforestated function.

With these and other objects in view, the invention consists in the combinations and arrangements of elements as set forth in the following specification and particularly pointed out in the appended claims.

In the accompanying drawing

Figure 1 is a view in side elevation of one form of leaf spring embodying this invention;

Figure 2 is an enlarged fragmentary view in side elevation of a portion of the spring, and showing the manner in which an anti-friction body embodying this invention is associated with the spring when first installed;

Figure 3 is a transverse sectional view taken on the line 3—3 of Figure 2;

Figure 4 is a view similar to Figure 2, but showing the manner in which the anti-friction body is associated with the spring in the normal operation of the invention;

Fig. 5 is a transverse sectional view taken on the line 5—5 of Figure 4.

Referring specifically to the drawing, the invention is embodied in a multi-leaf spring S, the leaves of which are secured together intermediate their ends, and the main leaf 10 of which is connected to the usual spring shackles 11—11. The remaining leaves 12 are provided adjacent their tips with recesses 13 confronting the next leaf, which recesses in the present instance are formed by laterally bending the leaves at the spaced points 14 and 15 so that the recesses extend transversely the full width of the leaves.

Mounted in each recess 13 for rolling contact with the bottom surface 16 thereof and with the confronting surface 17 of the next leaf, is an anti-friction body in the form of a solid metal roller 18 substantially co-extensive in length with the width of the springs at the recess. The peripheral surface of the roller is provided throughout its length with a multiplicity of projections in the present instance in the form of pyramidal teeth 19, and this surface is preferably case hardened or the roller otherwise heated to render the teeth of a greater hardness than the material of the springs.

The rollers 13 are installed by interposing them between the leaves when the load of the vehicle supported by the spring is relieved therefrom and the leaves are pried apart sufficiently to permit insertion of the rollers so that their axes extend transversely with respect to the length of the spring. The rollers are placed at that end of the recesses nearer the tips of the leaves so that when the load of the vehicle is again imposed on the spring the rollers will have rolled part way towards the other end of the recesses.

When the rollers are first installed, their teeth 19 will ride upon the confronting smooth surfaces 16 and 17 of the leaves, as shown in Figures 2 and 3, but as the spring flexes during travel of the vehicle, with consequent rotation of the rollers between the leaves, the relatively harder teeth will be forced to penetrate the relatively softer material of the leaves so as to form indentations 20 therein complementary to the teeth as shown in Figures 4 and 5. It will be noted from a consideration of these figures that the body diameter of the rollers at the bases or roots of the teeth is such that when maximum penetration of the leaves by the teeth has been effected, the tips of the leaves will remain slightly spaced from the next leaf so that a rolling contact rather than a sliding contact will be maintained due to the body diameter of the rollers being slightly greater than the depth of the recesses. Thus friction between the leaves will be reduced to a negligible minimum and squeaking of the spring obviated.

The teeth 19 and the complementary indentations 20 formed either by the teeth or by a separate operation with suitable machinery prior to installation of the rollers, broadly constitute a means for positively preventing both axial displacement and lateral tilting of the rollers following installation, thus insuring that the rollers will function with maximum efficiency at all times without necessitating any extraneous guiding or alining structure for this purpose.

In addition to the foregoing advantages, the invention enables spring leaves to be constructed of a uniform width and thickness throughout their lengths, which eliminates costly operations usually employed with conventional springs to reduce such dimensions at the tips of the leaves by tapering the leaves, for a materially freer action of the leaves over that obtained with leaves in direct sliding contact, is effected by the rollers.

I claim:

1. A spring of the class described comprising resilient leaves having recesses adjacent their tips, confronting the next leaf; and cylindrical anti-friction bodies mounted in said recesses for cylindrical rolling contact with the bottoms thereof and with the confronting surface of the next leaf to maintain the tips of each leaf out of contact with the next leaf, whereby to render the leaves relatively movable freely and without squeaking during flexing of the spring, said bodies having toothed peripheries of greater hardness than the material composing the leaves so that during flexing of the spring said teeth will penetrate the leaves to form complementary indentations therein for coaction with the teeth of the bodies in preventing lateral tilting and axial displacement of said bodies, the radial height of said teeth being such that when the teeth have penetrated the spring leaves to the full height of the teeth, the rollers will maintain the tip of one leaf out of contact with the next leaf.

2. A spring of the class described having at least two resilient leaves; an anti-friction body interposed between the leaves for rolling contact therewith during flexing of the leaves, and maintaining the tip of one leaf out of engagement with the other leaf so as to reduce friction to a minimum; and projections on the periphery of said body of a greater hardness than the materail of the spring, and operating to produce indentations in the spring during rotation of the body, for coaction of the projections and indentations in preventing lateral tilting and axial displacement of the body.

CLIFFORD O. ROSS.